United States Patent
Foladare et al.

(10) Patent No.: US 6,343,115 B1
(45) Date of Patent: *Jan. 29, 2002

(54) METHOD OF ANNOUNCING AN INTERNET CALL

(75) Inventors: Mark Jeffrey Foladare, Kendall Park; Shelley B. Goldman, East Brunswick; David Phillip Silverman, Somerville; Roy Philip Weber, Bridgewater, all of NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/600,690

(22) Filed: Feb. 13, 1996

(51) Int. Cl.[7] .............................. H04M 1/64; H04J 3/24
(52) U.S. Cl. .............................. 379/88.17; 379/88.13; 379/217.01; 379/900; 379/902; 370/349; 370/352
(58) Field of Search .............................. 370/352, 353, 370/380, 389, 892, 396, 401, 404, 427, 435, 450, 465, 485, 370, 346, 349; 379/90.01, 93.01, 93.05, 93.09, 100.15, 100.16, 67.1, 88.13, 88.17, 88.22, 170, 217.01, 900, 902, 913; 455/403, 410, 414, 427, 464, 412

(56) References Cited

U.S. PATENT DOCUMENTS

| | | | |
|---|---|---|---|
| 4,771,425 A | * | 9/1988 | Baran et al. .................. 370/85 |
| 4,995,074 A | | 2/1991 | Goldman et al. |
| 5,274,700 A | | 12/1993 | Gechter et al. |
| 5,311,750 A | | 5/1994 | Grimes |
| 5,327,486 A | * | 7/1994 | Wolff et al. .................. 379/96 |

(List continued on next page.)

FOREIGN PATENT DOCUMENTS

| | | |
|---|---|---|
| AU | B-59680198 | 3/1998 |
| CA | 2138565 | 12/1994 |
| DE | 3315884 | 5/1983 |
| EP | 0 758 175 A1 | 12/1995 |
| EP | 794643 A2 | 9/1997 |

(List continued on next page.)

OTHER PUBLICATIONS

"Definition of the Internet", FNC Resolution, Oct. 24, 1995.*
Nathan Muller, "Dial 1–800–Internet" Byte, 1996, vol. 21, Issue 2, Feb. 1996.
R. Babbage, I. Moffat, A O'Neill and S. Sivaraj, "Internet Phone—Changing the Telephony Paradigm" BT Technol J vol. 15, No. 2, Apr. 1997.

(List continued on next page.)

*Primary Examiner*—Allan Hoosain

(57) ABSTRACT

A called party is alerted to the presence of a voice call on the Internet (110) by a page that is automatically transmitted to the called party's pager (120) upon initiation of the call by a calling party from his terminal (101) running Internet voice communications software and equipped with a microphone (102) and speaker (103). The page is transmitted in response to a message sent by a service provider (115) on the Internet, which receives from the calling party's terminal on the Internet, information for identifying the called party's pager. The called party, upon receiving the page, connects to the called party on the Internet through his home terminal (105) that is running that same voice communications software and is also equipped with a microphone (106) and speaker (107), or through any such similarly equipped portable or fixed terminal (125) at any location from which the Internet can be accessed. Alternatively, the called party can answer the call on the Internet with a standard station set (131) by calling an Internet-savvy platform (130), which converts the packetized voice signal of the calling party into an analog signal and the analog voice signal of the called party into packets for transmission on the Internet.

23 Claims, 1 Drawing Sheet

U.S. PATENT DOCUMENTS

| | | | |
|---|---|---|---|
| 5,363,431 A | | 11/1994 | Schull et al. |
| 5,428,608 A | | 6/1995 | Freeman et al. |
| 5,438,616 A | | 8/1995 | Peoples |
| 5,526,353 A | * | 6/1996 | Henley et al. ............. 370/60.1 |
| 5,533,029 A | * | 7/1996 | Gardner ..................... 370/94.1 |
| 5,533,110 A | | 7/1996 | Pinard et al. |
| 5,604,737 A | * | 2/1997 | Iwami et al. ............... 370/352 |
| 5,608,446 A | * | 3/1997 | Carr et al. ..................... 348/6 |
| 5,608,786 A | * | 3/1997 | Gordon ...................... 379/100 |
| 5,610,910 A | * | 3/1997 | Focsaneanu et al. ........ 370/351 |
| 5,675,507 A | * | 10/1997 | Bobo, II ................. 364/514 R |
| 5,712,907 A | | 1/1998 | Wegner et al. |
| 5,724,412 A | | 3/1998 | Srinivasan |
| 5,726,984 A | * | 3/1998 | Kubler et al. ............... 370/349 |
| 5,740,231 A | * | 4/1998 | Cohn et al. .................... 379/88 |
| 5,742,596 A | | 4/1998 | Baratz et al. |
| 5,742,670 A | * | 4/1998 | Bennett ...................... 379/142 |
| 5,742,763 A | * | 4/1998 | Jones ...................... 395/200.3 |
| 5,742,905 A | * | 4/1998 | Pepe et al. .................. 455/461 |
| 5,751,706 A | | 5/1998 | Land et al. |
| 5,752,191 A | * | 5/1998 | Fuller et al. ................ 455/445 |
| 5,754,939 A | * | 5/1998 | Herz et al. ................... 455/4.2 |
| 5,768,513 A | | 6/1998 | Kuthyar et al. |
| 5,793,762 A | * | 8/1998 | Penners et al. ............. 370/389 |
| 5,805,587 A | * | 9/1998 | Norris et al. ............... 370/352 |
| 5,809,128 A | | 9/1998 | McMullin ................... 379/215 |
| 5,845,203 A | * | 12/1998 | LaDue ....................... 455/414 |
| 5,870,565 A | | 2/1999 | Glitho |
| 5,894,504 A | | 4/1999 | Alfred et al. |
| 5,896,444 A | | 4/1999 | Perlman et al. .......... 379/93.25 |
| 5,916,302 A | | 6/1999 | Dunn et al. |
| 5,946,381 A | | 8/1999 | Danne et al. ............... 379/142 |
| 5,999,808 A | * | 12/1999 | LaDue ....................... 455/412 |
| 6,011,909 A | | 1/2000 | Newlin et al. |
| 6,108,704 A | * | 8/2000 | Hutton et al. ............... 709/227 |

FOREIGN PATENT DOCUMENTS

| | | |
|---|---|---|
| EP | 800 325 A2 | 10/1997 |
| EP | 856 981 A2 | 8/1998 |
| EP | 905 959 A2 | 3/1999 |
| JP | 05004142 | 8/1994 |
| JP | 05343162 | 7/1995 |
| WO | WO 95/18501 | 7/1995 |
| WO | WO 97/14238 | 4/1997 |
| WO | WO 97/16007 | 5/1997 |
| WO | WO97/37483 | 10/1997 |
| WO | WO 97/37483 | 10/1997 |
| WO | WO97/46073 | 12/1997 |
| WO | WO 97/47118 | 12/1997 |
| WO | WO97/47118 | 12/1997 |
| WO | WO97/47119 | 12/1997 |
| WO | WO97/47127 | 12/1997 |
| WO | WO 98/41032 | of 1998 |
| WO | WO 98/01985 | 1/1998 |
| WO | WO98/01985 | 1/1998 |
| WO | WO98/07266 | 2/1998 |
| WO | WO98/19240 | 5/1998 |
| WO | WO 98/19448 | 5/1998 |
| WO | WO98/19471 | 5/1998 |
| WO | WO 98/24224 | 6/1998 |
| WO | WO 98/36551 | 8/1998 |
| WO | WO 98/51063 | 11/1998 |
| WO | WO 98/52332 | 11/1998 |
| WO | WO 98/54871 | 12/1998 |
| WO | WO 99/14924 | 3/1999 |

OTHER PUBLICATIONS

IBM Technical Disclosure Bulletin "Workstation Communications System", IBM Technical Disclosure Bulletin, vol. 37, No. 09, Sep. 1994.

Cui–Qing Yang, "INET Phone—Telephone Services and Servers on Internet", University of North Texas, Apr. 1995.

S. Harris, N. Psimenatos, P. Richards, I. Ebert, "Intelligent Network Realization and Evolution: CCITT Capability Set I and Beyond" International Switching Symposium, Oct. 1992, vol. 2.

Colin, Low "The Internet Telephony Red Herring" HP Laboratories Bristol, Jun. 1996.

* cited by examiner

METHOD OF ANNOUNCING AN INTERNET CALL

TECHNICAL FIELD

This invention relates to use of the Internet and Internet-like packet-switched data networks for communications between parties, and more particularly to a method for announcing to a called party that a call is waiting to be answered.

BACKGROUND OF THE INVENTION

Software is currently available than enables audio communications to be established between two parties connected through their computer terminals to the Internet or to an Internet-like packet-switched data network. An example of such software is Internet Phone available from VocalTec Ltd. When this software is installed on both party's computer terminals that are each equipped with a speaker and a microphone, the two parties, who may be located essentially anyplace in the world, can establish audio communications over the Internet with each other in a very inexpensive manner. In order for such communications to be established, however, both parties must be simultaneously connected to the Internet. Thus, both parties must prearrange to be connected at a set certain time, or a calling party must alert a called party in some manner, such as by a normal telephone call, to turn his terminal on and connect to the Internet. Such arrangements or pre-arrangements are not very conducive to normal telecommunications. An arrangement for alerting a called party that a call is waiting on the Internet from a calling party is therefore desirable

SUMMARY OF THE INVENTION

In accordance with the present invention, a called party is alerted that a call is waiting on the Internet by means of a page that is automatically broadcast to the called party in response to a message that is transmitted to the called party's paging supplier over the Internet by a service provider. This message is automatically generated in response to the initiation on the Internet of the calling party's call, and connection on the Internet to the service provider. The service provider uses the called party's Internet address as directly provided by the calling party, or as determined from the identity of the called party provided by the calling party, to determine the Internet address of the called party's paging provider and information for identifying the called party's pager, including its capcode and/or pager ID, and its frequency of operation. This information is then transmitted on the Internet to the called party's paging supplier, which thereupon launches the page to the identified called party. Upon being alerted by the page of a waiting call, the called party may dial into the Internet through his terminal from his normal "home" Internet address for connection to the calling party for audio communications with the calling party using the aforenoted software. Alternatively, in response to the page, the called party may access the Internet through any local Internet access provider and connect to the service provider, where the calling party's Internet address and the called party's Internet address are linked together for communications there between.

DETAILED DESCRIPTION

Figure 1:
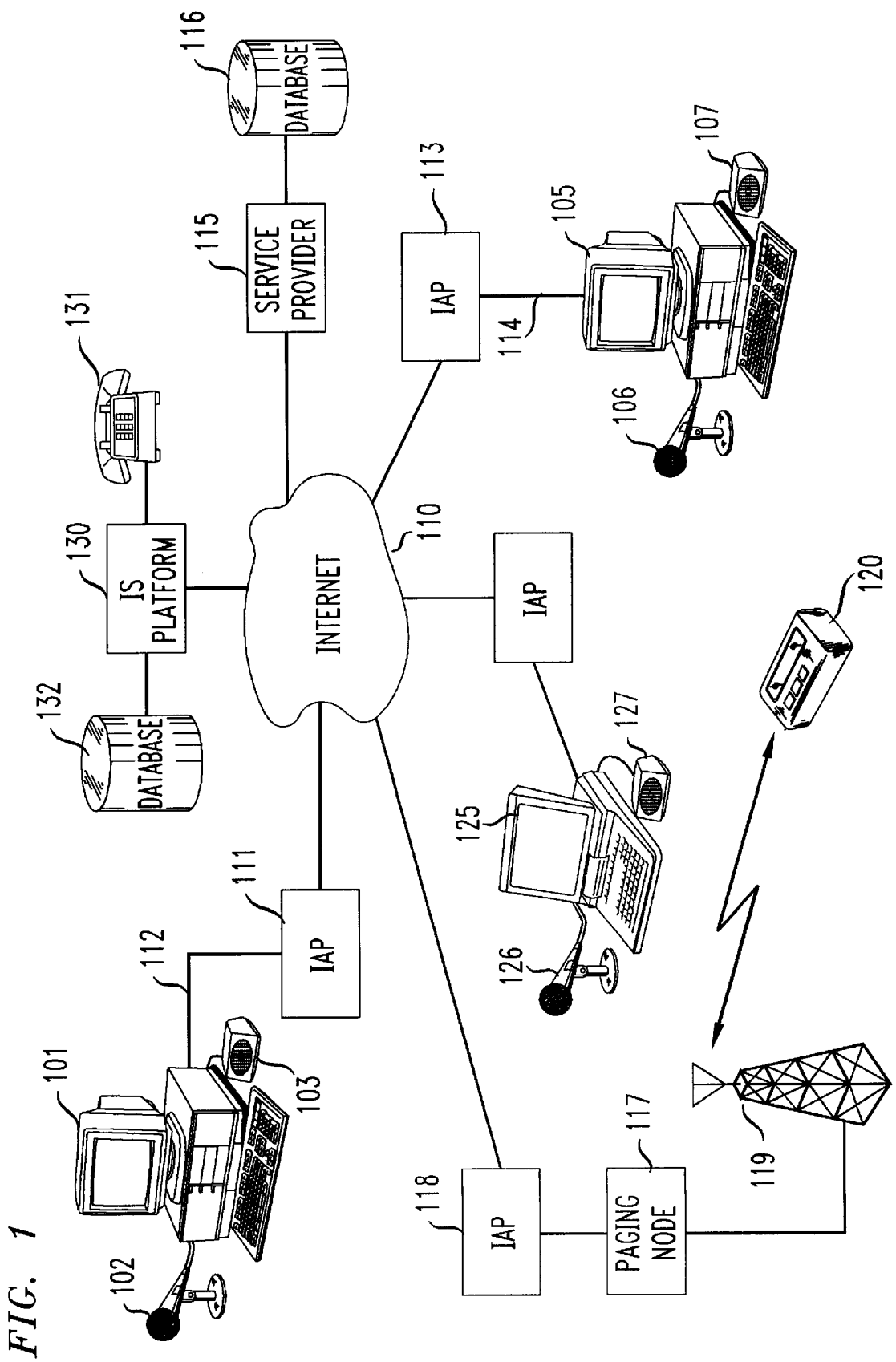
FIG. 1 shows an arrangement in accordance with the present invention for alerting a called party that a call is waiting on the Internet.

With reference to FIG. 1, a calling party desiring to engage in voice communications with another party over the Internet must have loaded into his terminal 101 the appropriate Internet voice communications software, such as Internet Phone from VocalTec Ltd. In addition, terminal 101 is equipped with a microphone 102 through which the calling party may talk, and a speaker 103 for listening to the called party. Using techniques which are not part of the present invention and will not be discussed in detail herein, the software converts the calling party's analog speech signal inputted through microphone 102 into a digital format for transmission in a packetized form over the Internet 110 to a called party. The called party's terminal 105 is simultaneously connected to the Internet 110 and is similarly equipped with the same software and a microphone 106 and a speaker 107. The software within terminal 105 converts the digital packetized speech received over the Internet 110 into an analog signal for broadcast over speaker 107, while converting the called party's speech inputted into microphone 106 into digital packetized format for transmission over the Internet 110 back to the calling party's terminal 101. In a similar manner, terminal 101 converts the received packets from terminal 105 into an analog signal for output over speaker 103 to the calling party.

Terminal 101 is connected to the Internet 110 through an Internet access provider (IAP) 111. The connection 112 to IAP 111 is through the calling party's local exchange network (not shown) and can be via a modem over a conventional POTS line, a switched or dedicated 56 kbps line, an ISDN line, or directly over a LAN. Similarly, terminal 105 is connected to the Internet 110 through an IAP 113. The connection 114 to IAP 113 is through the called party's local exchange network (not shown) and may also be either over a conventional POTS line via a modem, a switched or dedicated 56 kbps line, an ISDN line, or directly over a LAN.

As previously noted, both the calling and called parties must be simultaneously connected to the Internet in order for voice communications between them to take place. In accordance with the present invention, a called party is automatically paged to alert him of the presence of a call on the Internet. In response to the page to a portable pager 120 carried by or located proximate to the called party, the called party connects his terminal to the Internet so that the conversation can proceed. In particular, a calling party at terminal 101 initiates a call to a called party by opening a browser page of his Internet voice communications software. A message is then sent by terminal 101 through IAP 111 to a centralized service provider 115 having an associated database 116. Service provider 115 receives the calling party's message via the Internet 110 and, in response to the identity of the called party provided by the calling party, automatically launches a message to that called party's paging supplier, as determined in database 116. This message contains the information necessary to identify that called party's pager.

Database 116 stores for those parties subscribing to the service, a record containing each party's paging supplier, the Internet URL address of the paging supplier, and identification of the pager carried by the party, including either a pager capcode or pager ID plus an associated frequency of operation. The information in each record is addressable through either the URL address of the party or through an associated name of the party.

The message sent by terminal 101 to service provider 115 may contain the called party's URL address. In that case, the service provider 115 accesses the database 116 to determine the URL address of the called party's paging supplier and sends to that identified paging supplier a message containing the pager capcode or pager ID and the frequency of operation for the called party's pager. The service provider then opens up a URL to the address of the called party to await the connection of the called party to the Internet and sends a message via the Internet to the calling party that the page was sent.

The message sent by service provider 115 to the paging supplier is transmitted through the Internet 110 to the IAP 118 to which the paging supplier is connected. The paging supplier includes a paging node 117, which receives the message from the Internet and broadcasts a paging message from transmitting tower 119 at the frequency of operation of the called party's pager and containing that pager's capcode of pager ID. The capcode or pager ID together with the pager's frequency of operation uniquely identify the called party's pager 120. Thus, when the paging message is broadcast from transmitting tower 119, only the called party's pager 120 responds by emitting an auditory and/or a sensory signal, which alerts the called party, who is carrying or is proximate to the pager, to the presence of an Internet call. Pagers and paging systems are well known in the art.

In response to the page, the called party turns-on his terminal 105 and connects to the Internet through the initiation of the voice communications software by entering its browser mode to "answer" the call. The calling party and called party's URL addresses are then linked together and data transfer containing the digitized voice packets of each party's voice signal thereafter takes place directly between the calling party's terminal 101 and the called party's terminal 105 over the Internet 110.

As an alternative to providing the URL address of the called party, the calling party upon being connected to service provider 115 may only need to provide an alphabetical name or alias of the calling party. Service provider 115 can then retrieve from database 116 the URL address corresponding to calling party's name or alias. If an ambiguity between plural calling parties exists in the database, an HTML formatted textual information page is transmitted back to the calling party's terminal 101 over Internet 110, providing a list of called parties matching the requested subscriber's name. The calling party then chooses from the provided list, the particular party with which he wishes to communicate by clicking on the selected name.

In the discussion heretofore, it has been assumed that, in responding to the page, the called party logs onto his terminal and the Internet through his normal, or usual "home" Internet address. In a more advanced embodiment of the present invention, the called party, in response to the page, connects his terminal through his "home" IAP, or optionally connects a portable or fixed terminal through any IAP into which he can dial using local telephone facilities. Thus, in FIG. 1, the called party, upon receiving the page on his pager 120, accesses the Internet through a portable terminal 125 and associated microphone 126 and speaker 127, by means of a local telephone call to IAP 128. Upon being connected to IAP 128, the called party addresses service provider 115 over the Internet 110 and enters a password in order to reference this connection to the called party's connection. This password may be a fixed password always used by the calling party, or may be a password included in the page transmitted to the calling party's pager 120. In response to the called party's Internet connection to service provider 115, the addresses of the of the called party and the calling party are linked together so that packets of party's coded voice signals flow between the two end points. In this embodiment, therefore, the called party has the mobility to answer an Internet call by accessing the service provider 115 either from his "home" URL address or through any other more local IAP.

As described herein above, the called party "answers" the call in response to the page using a terminal that is executing voice communications software and which is equipped with a microphone and speaker. A called party may also answer a call in response to the page using standard telephone station set to dial into an Internet-savvy (IS) platform of the type described in co-pending application Ser. No. 08/494, 610, filed Jun. 23, 1995, which is incorporated herein by reference. Such an IS platform is capable of establishing connections to remote destinations via the Internet and, once connected, performing encoding/decoding and packetizing/ unpacketizing of voice signals. In FIG. 1, therefore, the called party, in response to a page, dials into a proximate IS platform 130 using a conventional telephone station set 131 over local telephone facilities 133. A centralized database 132 is associated with IS platform 130 and all such similar IS platforms distributed in diverse geographical locations. In response to the called party's identification of himself through the input of a password through DTMF signaling, IS platform 130 retrieves from database 132 the Internet address of the service provider 115 and forwards to service provider 115 the identity of the responding called party and the address of the particular IS platform to which the packetized and digitized voice signal of the calling party is to be directed. An end-to-end connection is then established between the calling party and the called party, the latter through IS platform 130, and therefrom in analog format to station set 131.

The above embodiments describe the establishment of voice communications over the Internet between a calling party and a called party in response to the automatic generation of a page which alerts the called party of the presence of a call. The present invention could also be applied to establishing other types of calls over the Internet or other Internet-like packetized data networks, or other data networks. For example, the call through the Internet may be a mixed media call, a multimedia call including audio, video and/or data, or a data call using modems at both terminating ends. With such expanded type of calling, the type of call as well as any special protocols that need to be established upon answering the call are also communicated to a party at the called end of the connection via the page before the called end responds to answer the call. Thus, for such expanded type of calling over the Internet, the service provider includes in its message to the paging supplier, data relating to the bandwidth of the call (indicative of the type of call) and associated protocol and billing information, including the associated Internet phone access provider and any sub-account information that may be needed, as such information is provided by the calling end in its connection to the service provider 115. The page to a party at the called end thus includes this bandwidth and protocol information, which is then used to properly terminate the connection. For situations in which a called party may receive any type of call, including a voice call, a page to the called party includes sufficient information to alert the called party of the type of call.

The present invention has been described herein above in connection with alerting a called party to the presence of a call directed to them over the Internet or Internet-like packetized data network. The invention could also be applied to alert a called party of the presence of a call over any network, including a switched communications network, such as the regular telephone network. In accordance with such an embodiment of the invention, in response to a call placed by a calling party to a called party, a message is automatically launched over the Internet to the called party's paging supplier and a page transmitted to the called party's pager alerting him of the presence of the call. Upon receipt of the page, the called party establishes a connection in the network to connect to the waiting call. Optionally, simultaneous connections can be made via the Internet, as described above, for simultaneous but separate voice/video connections.

The above-described embodiments are illustrative of the principles of the present invention. Other embodiments could be devised by those skilled in the art without departing from the spirit and scope of the present invention.

The invention claimed is:

1. A method of completing an Internet-telephony call carried at least in part over the Internet or an Internet-like packet-based network initiated by a calling party to a called party comprising the steps of:

in response to initiation of the Internet-telephony call from a terminal of the calling party, automatically transmitting a page to a pager associated with the called party, the page providing a message to the called party that an Internet-telephony call is present on the Internet or Internet-like packet-based data network for the called party; and in response to the page, receiving information originating from a terminal of the called party onto the Internet or Internet-like packet-based data network for establishing a connection at least in part over the Internet or Internet-like packet-based data network between the calling and called party's terminals to complete the Internet-telephony call whereby a live communication between the calling party and the called party commences.

2. The method of claim 1 wherein the page is transmitted to the calling party in response to a message to a paging supplier which broadcasts the page, the message to the paging supplier being transmitted to the paging supplier on the Internet or on the Internet-like packet-based data network.

3. The method of claim 1 wherein the Internet-telephony call is a voice call.

4. The method of claim 3 wherein the terminal of the calling party is a computer terminal running a software program for transmitting and receiving voice signals onto and off the Internet or the Internet-like packet-based data network.

5. The method of claim 4 wherein the terminal of the called party is a computer terminal running the software program and is connected by the called party to the Internet or the Internet-like packet-based data network in response to the page from a "home" location.

6. The method of claim 4 wherein the terminal of the called party is a computer terminal running the software program and is connected by the called party to the Internet or the Internet-like packet-based data network from a remote location in response to the page, and the method further comprises the step of linking the terminal of the called party at the remote location and the terminal of the calling party together on the Internet or the Internet-like packet-based data network.

7. The method of claim 4 wherein the terminal of the called party is a telephone station set that is connected to the Internet or the Internet-like packet-based data network by a call on a switched telephone network to an Internet-savvy platform that is connected to the Internet or the Internet-like packet-based data network.

8. The method of claim 1 wherein the message to the pager of the called party further indicates a protocol to be used by the called party's terminal to answer the call.

9. The method of claim 1 wherein the type of Internet-telephony call is a voice call, a mixed media call, a multimedia call, or a data call.

10. The method of claim 1 wherein the message to the paging supplier includes information for identifying the pager of the called party and the frequency at which it operates.

11. The method of claim 10 wherein the message to the paging supplier further includes information for identifying an Internet phone access provider and accounting or billing information.

12. A method of completing an Internet-telephony call carried at least in part over the Internet or an Internet-like packet-based data network initiated by a calling party to a called party comprising the steps of:

in response to the initiation of the Internet-telephony call from a terminal of the calling party to the called party, establishing a connection over the Internet or the Internet-like packet-based data network to a service provider having an associated database having stored information that associates the identity of a called party with paging information that includes a paging supplier associated with that called party;

retrieving from the database the paging information for the called party;

automatically transmitting a message to the paging supplier associated with the called party that includes the retrieved paging information for sending a message to the paging supplier to page the called party;

in response to the message, transmitting a page to the called party's pager that indicates to the called party that an Internet-telephony call for the called party is present on the Internet or Internet-like packet-based data network; and in response to the page, receiving information originating from a terminal of the called party onto the Internet or Internet-like packet-based data network for establishing a connection at least in part over the Internet or the Internet-like packet-based data network between the calling and called party's terminals to complete the Internet-telephony call such that a live communication between the calling party and the called party commences.

13. The method of claim 12 wherein the message to the paging supplier is transmitted on the Internet or on the Internet-like packet-based data network.

14. The method of claim 13 wherein the Internet-telephony call is a voice call.

15. The method of claim 14 wherein the terminal of the calling party is a computer terminal running a software program for transmitting and receiving voice signals onto and off the Internet or the Internet-like packet-based data network.

16. The method of claim 15 wherein the terminal of the called party is a computer terminal running the software program and is connected by the called party to the Internet or the Internet-like packet-based data network from a remote location in response to the page, and the method further comprises the step of linking the terminal of the called party at the remote location and the terminal of the calling party together on the Internet or the Internet-like packet-based data network.

17. The method of claim 15 wherein the terminal of the called party is a computer terminal running the software program and is connected by the called party to the Internet or the Internet-like packet-based data network in response to the page from a "home" location.

18. The method of claim 15 wherein the terminal of the called party is a telephone station set that is connected to the Internet or the Internet-like packet-based data network by a call on a switched telephone network to an Internet-savvy platform that is connected to the Internet or the Internet-like packet-based data network.

19. The method of claim 13 wherein the message to the paging supplier and the page to the called party indicates the type of call initiated by the calling party.

20. The method of claim 19 wherein the message to the paging supplier and the page to the called party further indicates a protocol to be used by the called party's terminal to answer the call.

21. The method of claim 19 wherein the type of call is a voice call, a mixed media call, a multimedia call, or a data call.

22. The method of claim 13 wherein the message to the paging supplier includes information for identifying the pager of the called party and the frequency at which it operates.

23. The method of claim 22 wherein the message to the paging supplier further includes information for identifying an Internet phone access provider and accounting or billing information.

* * * * *